US007619780B2

(12) United States Patent
Heydinger et al.

(10) Patent No.: US 7,619,780 B2
(45) **Date of Patent: *Nov. 17, 2009**

(54) METHOD FOR PERFORMING DUPLEX COPYING

(75) Inventors: Scott Heydinger, Lexington, KY (US); William Everette Gardner, Louisville, KY (US); Daryl Edward Janisch, Lexington, KY (US); Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 604 days.

This patent is subject to a terminal disclaimer.

(21) Appl. No.: 11/277,859

(22) Filed: Mar. 29, 2006

(65) Prior Publication Data

US 2007/0231031 A1 Oct. 4, 2007

(51) Int. Cl.
*G06K 15/00* (2006.01)

(52) U.S. Cl. ...................................... 358/3.2; 358/3.06

(58) Field of Classification Search ................ 358/3.26, 358/509; 399/364
See application file for complete search history.

(56) References Cited

U.S. PATENT DOCUMENTS

| | | | | | |
|---|---|---|---|---|---|
| 5,646,744 | A * | 7/1997 | Knox | .......................... | 358/401 |
| 5,832,137 | A * | 11/1998 | Knox | .......................... | 382/275 |
| 6,101,283 | A * | 8/2000 | Knox | .......................... | 382/254 |
| 2002/0071131 | A1* | 6/2002 | Nishida | ...................... | 358/1.9 |
| 2006/0263125 | A1* | 11/2006 | Gardner et al. | .............. | 399/364 |
| 2006/0263126 | A1* | 11/2006 | Heydinger et al. | .......... | 399/364 |
| 2007/0231031 | A1* | 10/2007 | Heydinger et al. | .......... | 399/374 |

* cited by examiner

*Primary Examiner*—Twyler L Haskins
*Assistant Examiner*—David L Suazo
(74) *Attorney, Agent, or Firm*—Taylor & Aust

(57) ABSTRACT

A method for performing duplex copying of a document having a first side with a first image and a second side with a second image includes scanning only the first side of the document under a first imaging condition to retrieve first information relating to each of the first image and the second image; scanning only the first side of the document under a second imaging condition to retrieve second information relating to each of the first image and the second image; determining from the first information and the second information contents of the first image on the first side of the document; and determining from the first information and the second information contents of the second image on the second side of the document.

20 Claims, 5 Drawing Sheets

METHOD FOR PERFORMING DUPLEX COPYING

CROSS REFERENCES TO RELATED APPLICATIONS

None

This patent application is related to the U.S. patent application Ser. No. 11/133,524, filed May 20, 2005, entitled "Method for Processing a Duplexed Document" and assigned to the assignee of the present application. This patent application is related to the U.S. patent application Ser. No. 11/277,882, filed Mar. 29, 2006, entitled "Method for Reducing Show-through in a Scanned Duplexed Document" and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to a method for processing a duplexed document, and, more particularly, to a method for performing duplex copying of a duplexed document.

2. Description of the Related Art

Products are readily available that include an ability to perform duplex copying. A portion of the duplex copying operation is to duplex scan both sides of a two-sided document, i.e., a duplexed document, to retrieve content of a front-side image and a back-side image of the duplex document. The scanning operation may then be followed by a duplex printing of the retrieved content of the scanned images on two sides of a single sheet of paper.

One type of scan mechanism used to perform duplex copying includes two sets of scanner sensors, wherein the document to be scanned is fed between the two sets of scanner sensors, with each set of scanner sensors scanning a respective single side of the document. Another type of scan mechanism includes a mechanism that passes the front side of the document over a single scanner sensor, flips the paper over, and then passes the reverse side of the document over the same single scanner sensor. Both of these approaches to duplex scanning require expensive hardware support, either in the form of an expensive second sensor or a more sophisticated sheet feeding system. Additionally, flipping the document over requires extra processing time.

SUMMARY OF THE INVENTION

The invention, in one embodiment thereof, is directed to a method for performing duplex copying of a document having a first side with a first image and a second side with a second image. The method includes scanning only the first side of the document under a first imaging condition to retrieve first information relating to each of the first image and the second image; scanning only the first side of the document under a second imaging condition to retrieve second information relating to each of the first image and the second image; determining from the first information and the second information contents of the first image on the first side of the document; and determining from the first information and the second information contents of the second image on the second side of the document.

The invention, in another embodiment thereof, is directed to a method for performing duplex copying of a duplexed document having a front side with a front-side image and a back side with a back-side image. The method includes scanning only the front side of the document under a first imaging condition to retrieve first information relating to each of the front-side image and the back-side image; scanning only the front side of the document under a second imaging condition to retrieve second information relating to each of the front-side image and the back-side image; determining from the first information and the second information a digital representation of the front-side image of the duplexed document; and determining from the first information and the second information a digital representation of the back-side image of the duplexed document.

The invention, in another embodiment thereof, is directed to a method for performing duplex copying of a document having a first side with a first image and a second side with a second image. The method includes scanning only the first side of the document under a first backlight condition to retrieve first information relating to each of the first image and the second image; scanning only the first side of the document under a second backlight condition to retrieve second information relating to each of the first image and the second image; determining from the first information and the second information contents of the first image on the first side of the document; and determining from the first information and the second information contents of the second image on the second side of the document.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
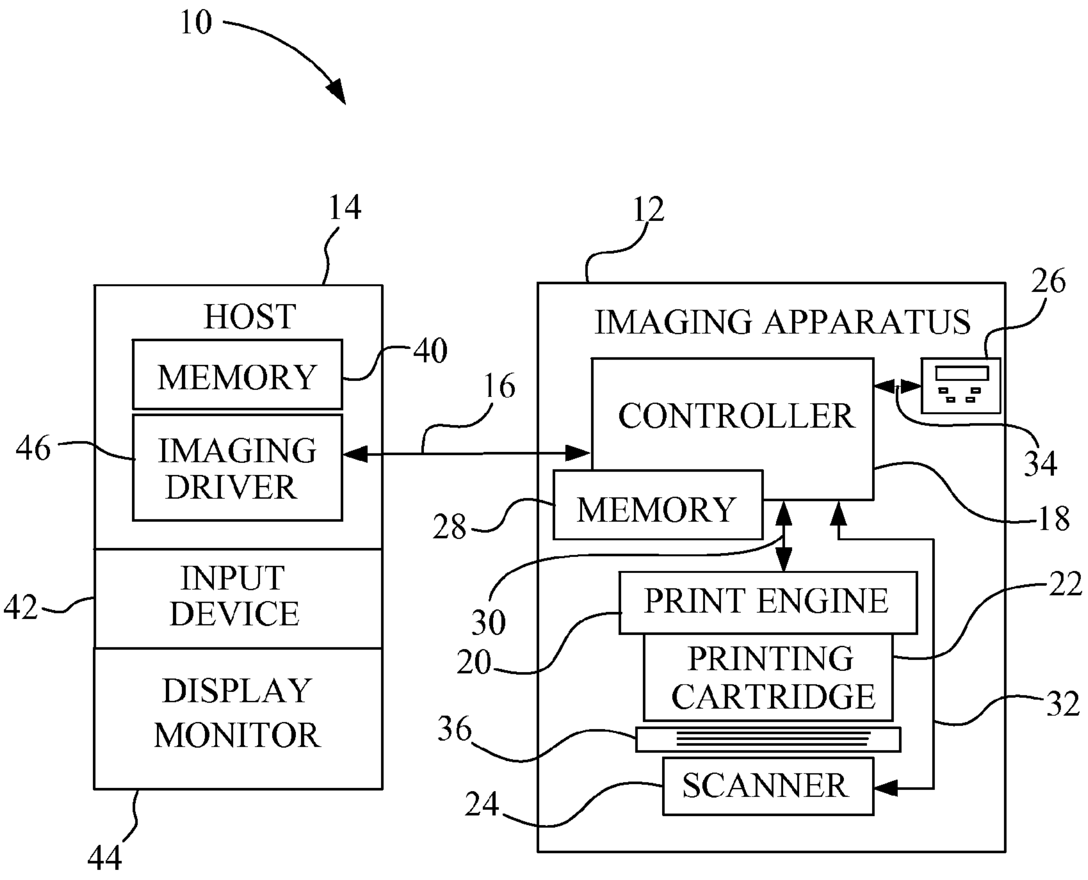
FIG. 1 is a diagrammatic depiction of an imaging system embodying the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. The term "image" as used herein encompasses any printed or digital form of text, graphic, or combination thereof. In addition, the terms "connected" and "coupled" and variations thereof are not restricted to physical or mechanical connections or couplings.

As used herein, the terms "copy" or "copying" mean generating an electronic image of a document via a scan operation which is converted to a visual output, such as on a display screen or a print medium. Also, the terms "front side" and "back side" are used for convenience sometimes to distinguish between the two opposite sides of a two-sided document, without regard to the order or the type of image present on the document.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Referring now to the drawings and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16. As used herein, the term "communications link" is used to generally refer to structure that facilitates electronic communication between multiple components, and may operate using wired or wireless technology.

Imaging apparatus 12 may be, for example, an ink jet printer and/or copier, an electrophotographic printer and/or copier, a thermal transfer printer and/or copier, or an all-in-one (AIO) unit that includes a print engine, a scanner unit, and possibly a fax unit that incorporate multiple functions such as scanning, copying, emailing and printing capabilities in one device. An AIO unit is also known in the art as a multifunction machine. For example, as shown in FIG. 1, imaging apparatus 12 includes a controller 18, a print engine 20, a printing cartridge 22, a scanner unit 24, and a user interface 26. Print engine 20 may utilize ink jet, dot matrix, dye sublimation, laser, and any other suitable print formats. Imaging apparatus 12 may communicate with host 14 via a standard communication protocol, such as for example, universal serial bus (USB), Ethernet or IEEE 812.1x.

Controller 18 includes a processor unit and associated memory 28, and may be formed as one or more Application Specific Integrated Circuits (ASIC). Memory 28 may be, for example, random access memory (RAM), read only memory (ROM), and/or non-volatile RAM (NVRAM). Alternatively, memory 28 may be in the form of a separate electronic memory (e.g., RAM, ROM, and/or NVRAM), a hard drive, a CD or DVD drive, or any memory device convenient for use with controller 18. Controller 18 may be a printer controller, a scanner controller, or may be a combined printer and scanner controller. In the present embodiment, controller 18 communicates with print engine 20 via a communications link 30. Controller 18 communicates with scanner unit 24 via a communications link 32. User interface 26 is communicatively coupled to controller 18 via a communications link 34. Controller 18 serves to process print data and to operate print engine 20 during printing, as well as to operate scanner unit 24 and process image data obtained via scanner unit 24.

In the context of the examples for imaging apparatus 12 given above, print engine 20 can be, for example, an ink jet print engine, an electrophotographic print engine or a thermal transfer engine, configured for forming an image on a sheet of print media 36, such as a sheet of paper transparency or fabric. As an ink jet print engine, for example, print engine 20 operates printing cartridge 22 to eject ink droplets onto the sheet of print media 36 in order to reproduce text and/or images. As an electrophotographic print engine, for example, print engine 20 causes printing cartridge 22 to deposit toner onto the sheet of print media 36, which is then fused to the sheet of print media 36 by a fuser (not shown), in order to reproduce text and/or images.

Host 14, which may be optional, may be, for example, a personal computer, including memory 40, such as RAM, ROM, and/or NVRAM, an input device 42, such as a keyboard or a pointing device, and a display monitor 44. Host 14 further includes a processor, input/output (I/O) interfaces, and at least one mass data storage device, such as a hard drive, a CD-ROM and/or a DVD unit.

Host 14 includes in its memory 40 a software program including program instructions that function as an imaging driver 46, e.g., printer/scanner driver software, for imaging apparatus 12. Imaging driver 46 is in communication with controller 18 of imaging apparatus 12 via communications link 16. Imaging driver 46 facilitates communication between imaging apparatus 12 and host 14, and may provide formatted print data to imaging apparatus 12, and more particularly, to print engine 20, to print an image.

In some circumstances, it may be desirable to operate imaging apparatus 12 in a standalone mode. In the standalone mode, imaging apparatus 12 is capable of functioning without host 14. Accordingly, all or a portion of imaging driver 46, or a similar driver, may be located in controller 18 of imaging apparatus 12 so as to accommodate printing during a copying or facsimile job being handled by imaging apparatus 12 when operating in the standalone mode.

Scanner unit 24 may be of a conventional scanner type, such as for example, a sheet feed or flat bed scanner, for scanning a document. The document may be a duplexed document, i.e., two-sided document, having a first side image and a second side image. In the context of the present invention, in some embodiments either scanner type may be used, and each may include a scan bar. As is known in the art, a sheet feed scanner transports a document to be scanned past a stationary sensor device, e.g., a stationary scan bar, and a flat bed scanner scans a stationary document with a movable scan bar.

As used herein, the term "first-side image" refers to the side of the duplexed document that is positioned to face scanner unit 24, and in particular, is positioned to face the scan bar that includes the image sensors, regardless of the image content. As used herein, the term "second-side image" refers to the side of the duplexed document that is not the first side image, e.g., is positioned to face away from scanner unit 24, and in particular, positioned to face away from the scan bar that includes the image sensors, regardless of the image content.

The scan bar of scanner unit 24 is generally either an optical reduction type using a combination of lens, mirror and a CCD (Charge Coupled Device) array or CIS (Contact Image Sensors) array. The CCD array is a collection of tiny, light-sensitive diodes, which convert photons into electrons. These diodes are called photosites—the brighter the light that hits a single photosite, the greater the electrical charge that will accumulate at that site. The image of the document that is scanned using a light source such as a fluorescent bulb reaches the CCD array through a series of mirrors, filters and lenses. The exact configuration of these components will depend on the model of scanner. Some optical reduction scanners use a three pass scanning method for performing color scanning. Each pass uses a different color filter (red, green or blue) between the lens and CCD array. After the three passes are completed, the scanner software assembles the three filtered images into a single full-color image. Most optical reduction scanners use the single pass method. The lens splits the image into three smaller versions of the original. Each smaller version passes through a color filter (either red, green or blue) onto a discrete section of the CCD array. The scanner software combines the data from the three parts of the CCD array into a single full-color image.

In general, for inexpensive flatbed scanners contact image sensors (CIS) are used in the scan bar. CIS arrays replaces the CCD array, mirrors, filters, lamp and lens with an array of red, green and blue light emitting diodes (LEDs) and a corresponding array of phototransistors for performing color scanning. The image sensor array consisting of 600, 1200, 2400 or 4800 LEDs and phototransistors per inch (depending on resolution) spans the width of the scan area and is placed very close to the glass plate upon which rest the image to be scanned. Another version of the CIS used a single set of red, green and blue LEDS in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality and resolution found in most optical reduction scanners. Color scanning is done by illuminating each color type of LED separately and then combining the three scans.

Figure 2:
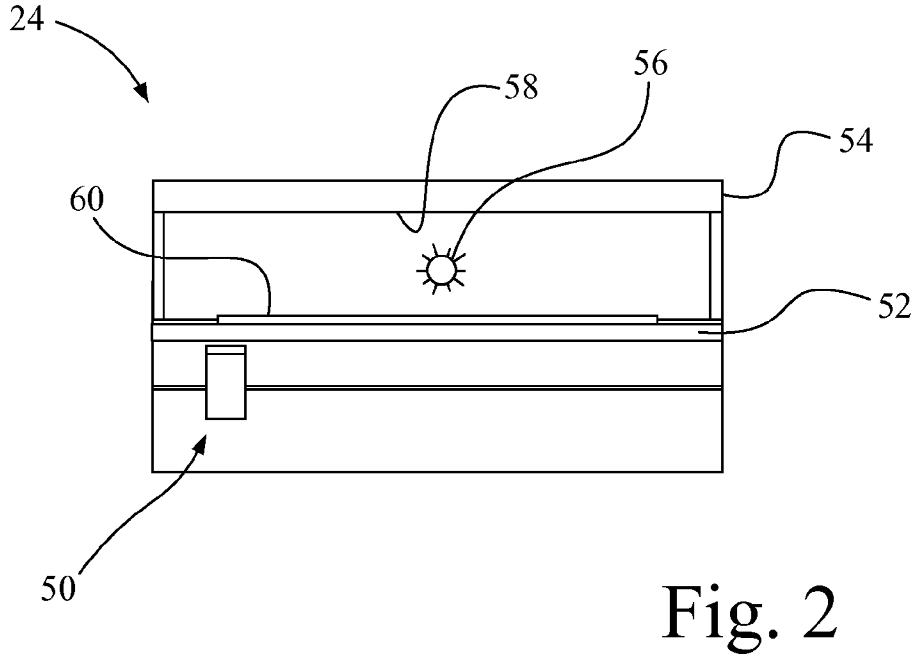
FIG. 2 is a diagrammatic representation of an embodiment of the scanner unit used in the imaging system of FIG. 1.

Referring to FIG. 2, there is shown an embodiment where scanner unit 24 is a flat bed scanner. Scanner unit 24 includes a scanning bar 50, a document glass or platen 52, a lid 54 and a backlight source 56. FIG. 2 shows scanner unit 24 with lid 54 in an open position. Lid 54 includes a surface that may form a background 58 for a document, e.g., a duplexed document 60, when lid 54 is closed. Backlight source 56 may be, for example, a lamp whose illumination amount is selectively controlled by controller 18. During operation, lid 54 is lifted, document 60 to be scanned is placed on document glass 52, and lid 54 is closed. Scanning bar 50, including one or more illuminants, e.g., lamps, LED arrays, etc., and including one or more sensor arrangements, is scanned over the side of the stationary document 60 adjacent to the scanning bar 50 to collect image data.

In one embodiment of the present invention, backlight source 56 is controlled, such as by controller 18, to provide two or more different backlight illumination levels. This may be achieved, for example, by adjusting the power supplied to backlight source 56. For example, backlight source 56 may be selectively turned on or off, or may adjusted to selectable illuminating levels. Alternatively, this variation in illumination may be achieved, for example, by opening lid 54, or a shutter on lid 54, and using ambient light to provide a different illumination level from that of the illumination level of backlight source 56, although such an approach may be less preferred due to the variability of the ambient light.

In another embodiment, the second backlight illumination level may be varied from the first backlight illumination level by changing the illumination characteristic of background 58 of scanner unit 24, which is positioned adjacent to the back side of document 60 during scanning of document 60 when lid 54 is closed. For example, background 58 may have a phosphorescent surface capable of emitting light at various intensities, depending on the amount of charging of the phosphorescent surface by a light source, and the phosphorescent surface may be charged by selectively activating the illuminant of scan bar 50 to charge the phosphorescent surface prior to positioning document 60 on document glass 52.

In another embodiment of the present invention, either backlight source 56 or the illuminant of scan bar 50 may be varied during a single scanning of the front side of duplexed document 60, e.g., in an alternating fashion, to produce at least two distinct imaging conditions.

Figure 3:
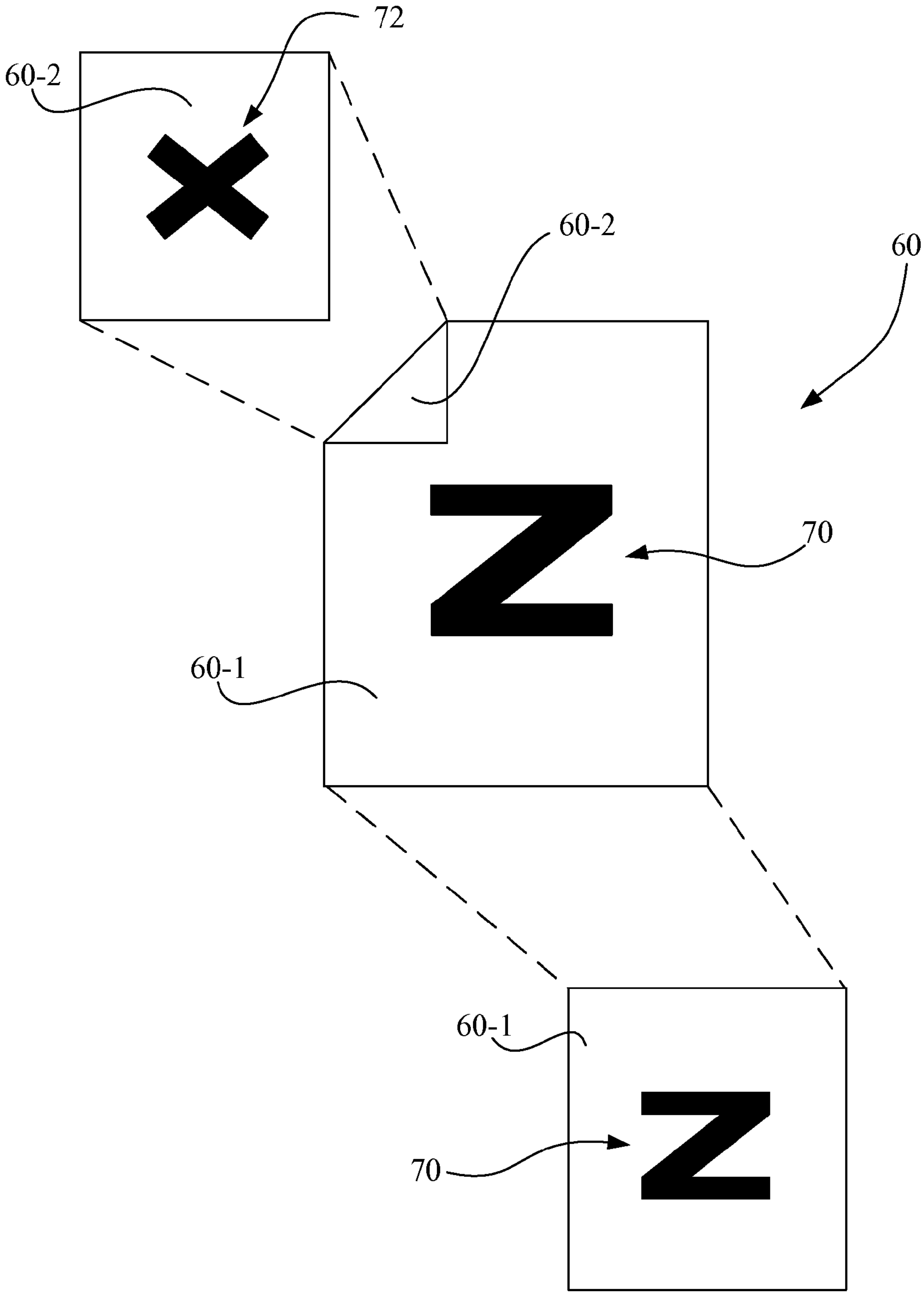
FIG. 3 shows a duplexed, i.e., two-sided, document.

FIG. 3 shows duplexed document 60, having a front side 60-1 and a back side 60-2. Document 60 is a duplex document, in that information is printed both on the front side 60-1 and the back side 60-2. Many media, such as common office paper, newsprint and magazines, are commonly classified as opaque. However, such media typically are not 100 percent reflective and instead allow some of the incident light to pass through. If something is printed on at least one side of the paper less light passes through the paper, but typically some light can still passes through the paper.

Figure 4A:
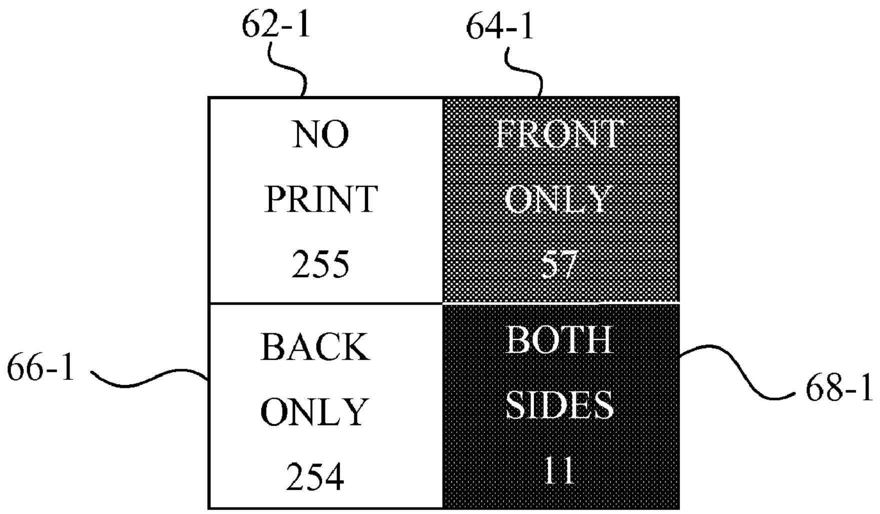
FIG. 4A illustrates an example of four combinations of front side/back-side images associated with the duplexed document illuminated using backside illumination at a first illumination level.

FIG. 4A illustrates an example of four combinations of front side/back-side images associated with duplexed document 60 as a result of duplexed document 60 having been scanned by scanner unit 24 on one side only, e.g., front side 60-1, and with duplexed document 60 being illuminated using backside illumination at a first illumination level. The four combinations are identified in region 62-1, region 64-1, region 66-1 and region 68-1. The results represented in FIG. 4A may be made, for example, with backlight source 56, e.g., a 100 watt bulb, being actuated at a full illumination level, e.g., 100 percent illumination with lid 54 closed.

The numbers in each of the regions 62-1, 64-1, 66-1, 68-1 are grayscale numbers, i.e., in a range from 0 representing black to 255 representing white. For example, 254 or 255 is near white, 57 is a medium gray, and 11 is a near black shade approaching black. Region 62-1 represent the areas on document 60 where nothing is printed on either of front side 60-1 or back side 60-2. Region 64-1 represents the areas on document 60 where solid black is printed on front side 60-1 only. Region 66-1 represents the areas on document 60 where solid black is printed on back side 60-2 only. Region 68-1 represent the areas on document 60 where solid black is printed on both front side 60-1 and back side 60-2.

Figure 4B:
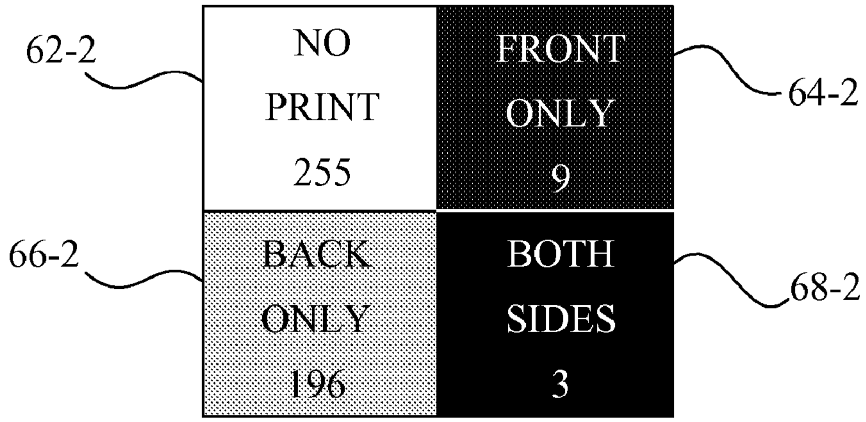
FIG. 4B illustrates an example of four combinations of front side/back-side images associated with the duplexed document illuminated using backside illumination at a second illumination level.

Likewise, FIG. 4B illustrates an example of four combinations of front side/back-side images associated with document 60 as a result of document 60 having been scanned by scanner unit 24 on one side only, e.g., front side 60-1, and with document 60 being illuminated using backside illumination at a second illumination level having an illumination intensity less than the illumination intensity used in the example illustrated in FIG. 4A. The four combinations are identified as region 62-2, region 64-2, region 66-2 and region 68-2. The results represented in FIG. 4B may be made, for example, with backlight source 56 being actuated at a relatively low illumination level, e.g., 25 percent of full illumination, with lid 54 closed. Alternatively, the results represented in FIG. 4B may be made using ambient light as the backlight source with lid 54 open, or a shutter on lid 54 open.

The numbers in each of the regions 62-2, 64-2, 66-2, 68-2 are grayscale numbers. For example, 196 is a light gray, 9 is a shade of black, and 3 is very near black. Region 62-2 represent the areas on document 60 where nothing is printed on either of front side 60-1 or back side 60-2. Region 64-2 represents the areas on document 60 where solid black is printed on front side 60-1 only. Region 66-2 represents the areas on document 60 where solid black is printed on back side 60-2 only. Region 68-2 represent the areas on document 60 where solid black is printed on both front side 60-1 and back side 60-2.

The results of FIGS. 4A and 4B indicate that under either backlight illuminating condition, e.g., at full backlight illumination intensity or at a reduced level, e.g., low level, backlight illumination intensity, only three out of the four regions are discernable from each other. For example, in the example of FIG. 4A, the grayscale values indicate that with full backlight illumination intensity, regions 62-1 (no print) and 66-1 (print on back side only) are practically statistically indiscernible. In the example of FIG. 4B, the grayscale values indicate that with low level backlight illumination intensity, region 64-2 (print on front side only) and 68-2 (print on both sides) are statistically indiscernible even though their averages are separated by six digital counts, because the distributions of values within regions 64-2 and 68-2 will overlap.

Although the backlight conditions of FIGS. 4A and 4B individually only allow discrimination of three of the four possible front/back printing combinations, when used together the two backlight conditions allow discrimination of all four states, i.e., no print, print on back side only, print on front side only and print on both sides.

Figure 5:
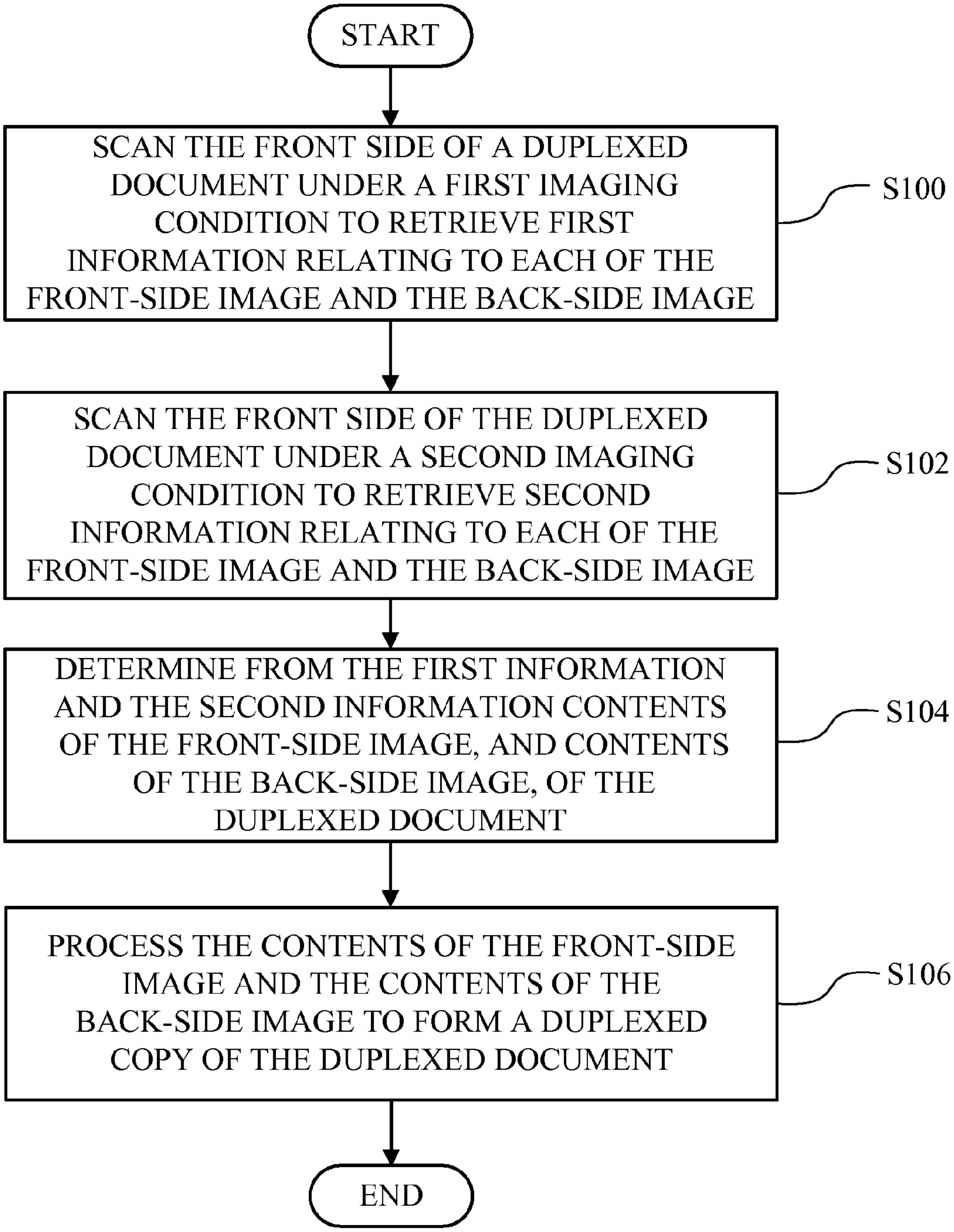
FIG. 5 is a flowchart of a method for performing duplex copying in accordance with an embodiment of the present invention.

FIG. 5 is a flowchart of a method for performing duplex copying of a document, e.g., duplexed document 60, having a first side with a first image and a second side with a second image, in accordance with an embodiment of the present invention. Considering again duplexed document 60 of FIG. 3, front side 60-1 includes a front-side image 70 formed as the letter Z, and back side 60-2 includes a back-side image 72 formed as the letter X. When viewing through document 60, e.g., from front side 60-1 to back side 60-2, the Z image overlaps with the X image. In summary, the present invention generates a representation of the Z image of front side 60-1 and a representation of the X image of back side 60-2 using two differently illuminated scans of only one side, e.g., the front side, of the document. Thereafter, these representations may be used to generate a two-sided copy of duplexed document 60.

The method may be performed, for example, by imaging apparatus 12, such as an AIO unit, i.e., multifunction machine, either in a standalone mode or when operating in conjunction with host 14. As such, the steps of the flowchart of FIG. 5 may be performed by program instructions executed by controller 18 of imaging apparatus 12, or alternatively, by program instructions executed by host 14 in conjunction with imaging apparatus 12.

At step S100, a first side, e.g., front side 60-1, of duplexed document 60 is scanned under a first imaging condition, e.g., a first backlight condition, to retrieve first information relating to each of a first image, e.g., front-side image 70 and a second image, e.g., back-side image 72 (see FIG. 3). The first backlight condition may be, for example, a backlight illumination at the full illumination intensity available from backlight source 56 as controlled by controller 18. Alternatively, the first imaging condition may be a first illumination intensity of the illuminant of scanning bar 50. The first information of step S100 is illustrated in FIG. 6A, and may be represented by digital data.

Figure 6A:
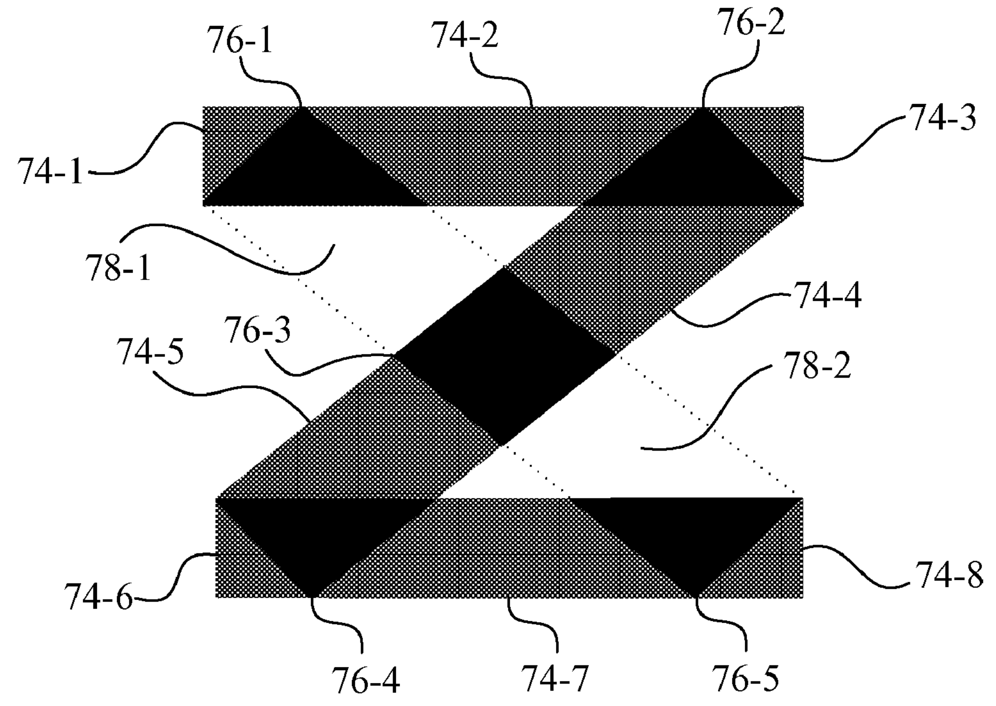
FIG. 6A illustrates first information relating to each of the front-side image and the back-side image of the duplexed document, determined in accordance with the method of FIG. 5.

FIG. 6A is shown to include substantially just three shades: gray, black, and white, which may be compared to the results illustrated in FIG. 4A and described above. The gray areas 74-1, 74-2, 74-3, 74-4, 74-5, 74-6, 74-7 and 74-8 are at grayscale level 57, and are the pixel positions with a printed image 70 on front side 60-1 only. The black areas 76-1, 76-2, 76-3, 76-4, and 76-5 are at grayscale level 11, and are a subset of the front-side image 70, correspond to pixel positions whereby there is also a printed image 72 on back side 60-2 of the document 60. It is then readily observed that the non-white areas 74-1, 74-2, 74-3, 74-4, 74-5, 74-6, 74-7, 74-8, 76-1, 76-2, 76-3, 76-4, and 76-5 correspond to front-side image 70 on front side 60-1 of FIG. 3. Of course, the white regions generally indicate areas where there is no image on either of front side 60-1 or back side 60-2 of duplexed document 60, except for regions 78-1 and 78-2 at grayscale level 254 where only back-side image 72 exists, but is essentially indiscernible from the white regions generally.

At step S102, the first side, i.e., front side 60-2 of duplexed document 60 in this example, is scanned under a second imaging condition, e.g., a second backlight condition, to retrieve second information relating to each of the first image, e.g., front-side image 70, and the second image, e.g., back-side image 72. The second backlight condition may be, for example, a backlight illumination at low illumination intensity, e.g., 25 percent of full intensity, available from backlight source 56 as selectively controlled by controller 18. Alternatively, the second imaging condition may be a second illumination intensity of the illuminant of scanning bar 50, different from the first illumination intensity of the illuminant of scanning bar 50. The second information of step S102 is illustrated in FIG. 6B, and may be represented by digital data.

Figure 6B:
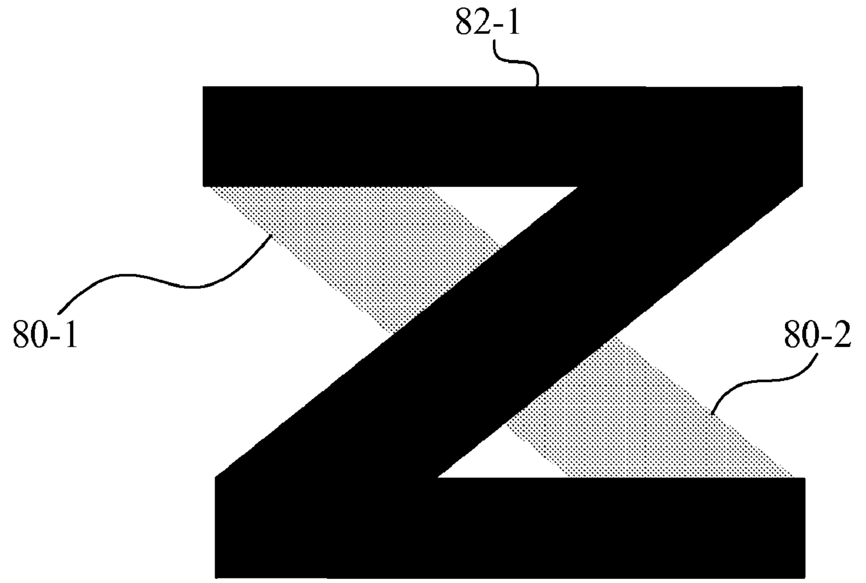
FIG. 6B illustrates second information relating to each of the front-side image and the back-side image of the duplexed document, determined in accordance with the method of FIG. 5.

FIG. 6B is shown to include substantially just three shades: white, gray, and black, which may be compared to the results illustrated in FIG. 4B and described above. However, the meaning of these three shades is not the same as the meaning of the three shades from FIG. 6A due to the change in backlight illumination conditions. Although white still indicates areas where there is no information on either side of duplexed document 60, the gray shades of gray areas 80-1 and 80-2 at grayscale level 196 now indicate areas where there is a printed image 72 (see FIG. 3) on back side 60-2 only. This fills in the only remaining information not found from FIG. 6A. The front-side image 70 (see FIG. 3) and its overlap with backside image 72 are now essentially a single black area 82-1, since the individual grayscale black levels (in a range from about 3 to 9) are essentially indiscernible.

At step S104, it is determined from the first information and the second information contents of the first image, e.g., the contents of front-side image 70 of FIG. 3, and it is determined from the first information and the second information contents of the second image, e.g., the contents of back-side image 72 of FIG. 3, of the duplexed document 60. The contents of the first image may be, for example, a digital representation of the first image. The contents of the second image may be, for example, a digital representation of the second image.

An algorithm that computes the front-side image 70 (FRONT) and back-side image 72 (BACK) corresponding to the image content of the two sides of duplexed document 60 utilizing the two scans of only front side 60-1, as described above, is as follows:

```
initialize two images (FRONT and BACK), setting all pixels to "white"
for (all image pixels both horizontally and vertically
{
    if (full illumination = gray)
        set FRONT image to "black"
    if (full illumination = black)
        set FRONT and BACK image to "black"
    if (low illumination = gray)
        set BACK image to "black"
}
```

Although the exemplary algorithm above involves a simple sequence of "if" type comparisons, the front and back information may be governed or described by a set of more general functions, such as:

FRONT=f (first backlight condition, second backlight condition)

BACK=g (first backlight condition, second backlight condition)

where f and g represent functions that return values such as "yes" or "no", indicating whether there is front or back image content on the document as a function of the 0 to 255 gray-scale value returned by the scanner under the two illuminating conditions on a pixel by pixel basis.

At step S106, the contents of the first image, e.g., front-side image 70 and contents of the second image, e.g., back-side image 72, of the duplexed document 60 are processed by controller 18 and sent to print engine 20 for printing to form a duplexed copy of document 60 on the sheet of print media 36. In other words, the contents of the front-side image 70 will be printed on one side of the duplexed copy, and the contents of the back-side image 72 will be printed on the other side of the duplexed copy.

Those skilled in the art will recognize that the number of imaging conditions, e.g., backlight conditions, may be increased beyond two, if desired, to collect additional data for use in practicing the invention.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for performing duplex copying of a document having a first side with a first image and a second side with a second image, comprising:

scanning only said first side of said document under a first imaging condition to retrieve first information relating to each of said first image and said second image;

scanning only said first side of said document under a second imaging condition to retrieve second information relating to each of said first image and said second image;

determining from said first information and said second information contents of said first image on said first side of said document; and determining from said first information and said second information contents of said second image on said second side of said document.

2. The method of claim 1, further comprising processing said contents of said first image and said contents of said second image to form a duplexed copy of said document.

3. The method of claim 1 wherein said first imaging condition and said second imaging condition occur during a single scanning of said first side of said document.

4. The method of claim 1 wherein said first imaging condition is a backlight illumination of said back side of said document using a first backlight illumination intensity, and said second imaging condition is a backlight illumination of said back side of said document using a second backlight illumination intensity different from said first backlight illumination intensity.

5. The method of claim 4, further comprising controlling a backlight source to selectively operate at said first backlight illumination intensity and said second backlight illumination intensity.

6. The method of claim 4 wherein said first backlight illumination intensity is a full illumination intensity of said backlight source and said second backlight illumination intensity is a reduced percentage of said first backlight illumination intensity.

7. The method of claim 4, wherein at least one of said first imaging condition and said second imaging condition is achieved by varying a light emission of a phosphorescent background positioned adjacent said second side of said document.

8. A method for performing duplex copying of a duplexed document having a front side with a front-side image and a back side with a back-side image, comprising:

scanning only said front side of said duplexed document under a first imaging condition to retrieve first information relating to each of said front-side image and said back-side image;

scanning only said front side of said duplexed document under a second imaging condition to retrieve second information relating to each of said front-side image and said back-side image;

determining from said first information and said second information a digital representation of said front-side image of said duplexed document; and determining from said first information and said second information a digital representation of said back-side image of said duplexed document.

9. The method of claim 8, further comprising processing said digital representation of said front-side image and said digital representation of said back-side image to form a duplexed copy of said duplexed document.

10. The method of claim 8 wherein said first imaging condition is a backlight illumination of said back side of said duplexed document using a first backlight illumination intensity, and said second imaging condition is a backlight illumination of said back side of said duplexed document using a second backlight illumination intensity different from said first backlight illumination intensity.

11. The method of claim 10, further comprising controlling a backlight source to selectively operate at said first backlight illumination intensity and said second backlight illumination intensity.

12. The method of claim 10 wherein said first backlight illumination intensity is a full illumination intensity of said backlight source and said second backlight illumination intensity is a reduced percentage of said first backlight illumination intensity.

13. The method of claim 10, wherein at least one of said first imaging condition and said second imaging condition is achieved by varying a light emission of a phosphorescent background positioned adjacent said second side of said duplexed document.

14. A method for performing duplex copying of a document having a first side with a first image and a second side with a second image, comprising:

scanning only said first side of said document under a first backlight condition to retrieve first information relating to each of said first image and said second image;

scanning only said first side of said document under a second backlight condition to retrieve second information relating to each of said first image and said second image;

determining from said first information and said second information contents of said first image on said first side of said document; and determining from said first information and said second information contents of said second image on said second side of said document.

15. The method of claim 14, further comprising processing said contents of said first image and said contents of said second image to form a duplexed copy of said document.

16. The method of claim 14 wherein said contents of said first image is a digital representation of said first image, and said contents of said second image is a digital representation of said second image.

17. The method of claim 14 wherein said first backlight condition is a backlight illumination of said back side of said document using a first backlight illumination intensity, and said second backlight condition is a backlight illumination of said back side of said document using a second backlight illumination intensity different from said first backlight illumination intensity.

18. The method of claim 17, comprising controlling a backlight source to selectively operate at said first backlight illumination intensity and said second backlight illumination intensity.

19. The method of claim 17 wherein said first backlight illumination intensity is a full illumination intensity of said backlight source and said second backlight illumination intensity is a reduced percentage of said first backlight illumination intensity.

20. The method of claim 17, wherein at least one of said first backlight condition and said second backlight condition is achieved by varying a light emission of a phosphorescent background positioned adjacent said second side of said document.

* * * * *

UNITED STATES PATENT AND TRADEMARK OFFICE

CERTIFICATE OF CORRECTION

PATENT NO. : 7,619,780 B2
APPLICATION NO. : 11/277859
DATED : November 17, 2009
INVENTOR(S) : Heydinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this

Twenty-sixth Day of October, 2010

David J. Kappos

*Director of the United States Patent and Trademark Office*